(12) United States Patent (10) Patent No.: US 12,691,523 B2
Niitsu et al. (45) Date of Patent: Jul. 28, 2026

(54) PROCESSING METHOD AND PROCESSING APPARATUS FOR WORKPIECE

(71) Applicant: DISCO CORPORATION, Tokyo (JP)

(72) Inventors: Keiichiro Niitsu, Tokyo (JP); Youngsuk Kim, Tokyo (JP); Koji Watanabe, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 983 days.

(21) Appl. No.: 17/931,952

(22) Filed: Sep. 14, 2022

(65) Prior Publication Data

US 2023/0090909 A1 Mar. 23, 2023

(30) Foreign Application Priority Data

Sep. 17, 2021 (JP) ................................. 2021-151907

(51) Int. Cl.
 *B23K 26/00* (2014.01)
 *B23K 26/354* (2014.01)
(52) U.S. Cl.
 CPC ........ *B23K 26/0093* (2013.01); *B23K 26/354* (2015.10)
(58) Field of Classification Search
 CPC ............ B23K 2103/56; B23K 2101/40; B23K 26/0006; B23K 26/53; B23K 26/0622; B23K 26/0823; B23K 26/0869; B23K 26/0604; B23K 26/352; B23K 26/50; B23K 26/60; B23K 26/702; B23K 37/0408; B23K 2103/50; B23K 2103/52;

B23K 2103/54; B23K 26/0093; B23K 26/032; B23K 26/0661; B23K 26/0665; B23K 26/083; B23K 26/0838; B23K 26/0853;

(Continued)

(56) References Cited

U.S. PATENT DOCUMENTS

2008/0076256 A1* 3/2008 Kawai .................. B23K 26/389
 257/E21.597
2010/0059862 A1 3/2010 Seddon (Continued)

FOREIGN PATENT DOCUMENTS

JP S64-82610 A 3/1989
JP 2007-245235 A 9/2007

(Continued)

OTHER PUBLICATIONS

Office Action issued by the Japanese Patent Office for corresponding JP Patent Application No. 2021-151907, dated May 20, 2025.

*Primary Examiner* — Chris Q Liu
(74) *Attorney, Agent, or Firm* — Greer Burns & Crain Ltd.

(57) ABSTRACT

Disclosed is a processing method for a workpiece. The processing method includes a holding step of holding the workpiece on a holding table, a grinding step of grinding the workpiece that is held on the holding table at and around its center by a grinding wheel, so that a recess portion is formed at and around the center of the workpiece and an annular projection portion is formed surrounding the recess portion at and along an outer periphery of the workpiece, and a fusion step of applying a laser beam to a surface of the workpiece, the surface having been ground in the grinding step, so that the ground surface is fused. A processing apparatus for a workpiece is also disclosed.

5 Claims, 8 Drawing Sheets

(58) Field of Classification Search
CPC .... B23K 26/10; B23K 26/354; B23K 26/359;
B23K 26/364; B23K 26/38; B23K 26/389
See application file for complete search history.

(56) References Cited

U.S. PATENT DOCUMENTS

| | | | | |
|---|---|---|---|---|
| 2019/0030651 A1* | 1/2019 | Sekiya | .................... | B23K 26/53 |
| 2019/0326870 A1* | 10/2019 | Kai | .................... | H03H 9/02866 |
| 2020/0013664 A1* | 1/2020 | Yamamoto | .......... | H10P 72/7624 |
| 2020/0086426 A1* | 3/2020 | Yamamoto | ........... | B23K 26/364 |
| 2020/0090934 A1* | 3/2020 | Kitahara | ................ | H10P 54/00 |
| 2020/0096318 A1* | 3/2020 | Kimura | ................ | G01B 11/06 |
| 2020/0103220 A1* | 4/2020 | Kimura | .................... | B24B 49/12 |
| 2020/0111658 A1* | 4/2020 | Sugiya | .................... | H10P 52/00 |
| 2020/0130106 A1* | 4/2020 | Izuka | ....................... | B24D 3/00 |
| 2020/0150038 A1* | 5/2020 | Ito | .......................... | G01N 21/64 |
| 2020/0168451 A1* | 5/2020 | Lu | .......................... | H10P 52/00 |
| 2020/0185275 A1* | 6/2020 | Lan | ......................... | H10P 54/00 |
| 2020/0215649 A1* | 7/2020 | Genda | ............... | B23K 26/0006 |

FOREIGN PATENT DOCUMENTS

| | | |
|---|---|---|
| JP | 2008-010557 A | 1/2008 |
| JP | 2011071286 A | 4/2011 |
| JP | 2019-029382 A | 2/2019 |
| JP | 2020-141088 A | 9/2020 |
| JP | 2021-100773 A | 7/2021 |
| JP | 2021-141099 A | 9/2021 |

* cited by examiner

PROCESSING METHOD AND PROCESSING APPARATUS FOR WORKPIECE

BACKGROUND OF THE INVENTION

Field of the Invention

The present invention relates to a processing method and a processing apparatus for a workpiece. The processing method and machine are useful for thinning the workpiece.

Description of the Related Art

There is known a grinding method that grinds a workpiece at and around a center thereof to form a recess portion and an annular projection portion surrounding the recess portion (see JP 2011-071286A).

SUMMARY OF THE INVENTION

In the ground surface of the workpiece, however, minute cracks and chipping and grinding marks are formed, leading to a possibility that fracture or breakage may occur during a transfer or subsequent step after the grinding and also a possibility that, when divided into chips, the chips may be reduced in flexural strength. Especially at a boundary between the recess portion and the annular projection portion, stress tends to concentrate, so that the boundary is prone to rupture compared with other portions. The occurrence of cracks, minute chipping, and the like around the boundary therefore poses a possibility that the annular projection portion may fracture from the boundary as a starting point and cracks may spread to a central region where devices have been formed.

The present invention therefore has as an object thereof the provision of a processing method and a processing apparatus for a workpiece, which, in a processing method that forms a recess portion and an annular projection portion surrounding the projection portion, can heal damage including cracks, marks, chipping, and the like occurred from grinding.

In accordance with a first aspect of the present invention, there is provided a processing method for a workpiece. The processing method includes a holding step of holding the workpiece on a holding table, a grinding step of grinding the workpiece that is held on the holding table at and around a center thereof by a grinding wheel, so that a recess portion is formed at and around the center of the workpiece and an annular projection portion is formed surrounding the recess portion at and along an outer periphery of the workpiece, and a fusion step of applying a laser beam to a surface of the workpiece, the surface having been ground in the grinding step, so that the ground surface is fused.

Preferably, the fusion step may include applying the laser beam to a boundary region including a boundary between the recess portion and the annular projection portion and peripheries of the boundary.

Preferably, the boundary region may include at least one of an inner side surface of the annular projection portion and an outer peripheral portion of the recess portion, the outer peripheral portion being continuous with the inner side surface.

Preferably, the grinding step may include a vertical direction grinding step of relatively moving the grinding wheel in a vertical direction with respect to the holding table, and a horizontal direction moving step of relatively moving the grinding wheel with respect to the holding table in a horizontal direction toward the center of the workpiece. Preferably, by the vertical direction grinding step and the horizontal direction moving step, an oblique surface may be formed inclined in a step shape or a slope shape from a side of an inner periphery of an upper surface of the annular projection portion toward a center of the recess portion. Preferably, the boundary region may include the oblique surface.

In accordance with a second aspect of the present invention, there is provided a processing apparatus for a workpiece. The processing apparatus includes a holding table configured to hold the workpiece, a grinding unit configured to grind the workpiece that is held on the holding table by a grinding wheel, a laser beam application unit configured to apply a laser beam to a surface of the workpiece, the surface having been ground by the grinding wheel, and a moving unit configured to move the holding table between the grinding unit and the laser beam application unit. The grinding unit is configured to grind the workpiece that is held on the holding table at and around a center thereof by the grinding wheel, so that a recess portion is formed at and around the center of the workpiece and an annular projection portion is formed surrounding the recess portion at and along an outer periphery of the workpiece. The laser beam application unit is configured to apply the laser beam to the ground surface of the workpiece, so that the ground surface is fused.

Preferably, the laser beam application unit may be configured to apply the laser beam to a boundary region including a boundary between the recess portion and the annular projection portion and peripheries of the boundary.

Preferably, the processing apparatus may further include a vertically moving unit configured to relatively move the grinding wheel in a vertical direction with respect to the holding table, and a horizontally moving unit configured to relatively move the grinding wheel, with respect to the holding table, in a horizontal direction toward the center of the workpiece. Preferably, the grinding unit may be configured to grind the workpiece while relatively moving the grinding wheel with respect to the holding table by the vertically moving unit and the horizontally moving unit, so that an oblique surface is formed inclined in a step shape or a slope shape from a side of an inner periphery of an upper surface of the annular projection portion toward a center of the recess portion. Preferably, the boundary region may include the oblique surface.

In the processing method of this invention, the laser beam is applied to the ground surface, that is, the recess portion of the workpiece, after the grinding, so that the recess portion is fused. Accordingly, the processing method of this invention can easily planarize the recess portion which is not easily accessible by a polishing pad, and can also easily heal a subsurface that contains damage occurred during the grinding.

Further, with the configuration that the laser beam is applied to the boundary region of the recess portion, the boundary region is fused and is allowed to cool, so that, even if cracks have been formed in the boundary region during the grinding, the cracks can be filled and closed. It is hence possible to reduce the possibility that a fracture or chipping may occur on the workpiece from the cracks as starting points in a subsequent step.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
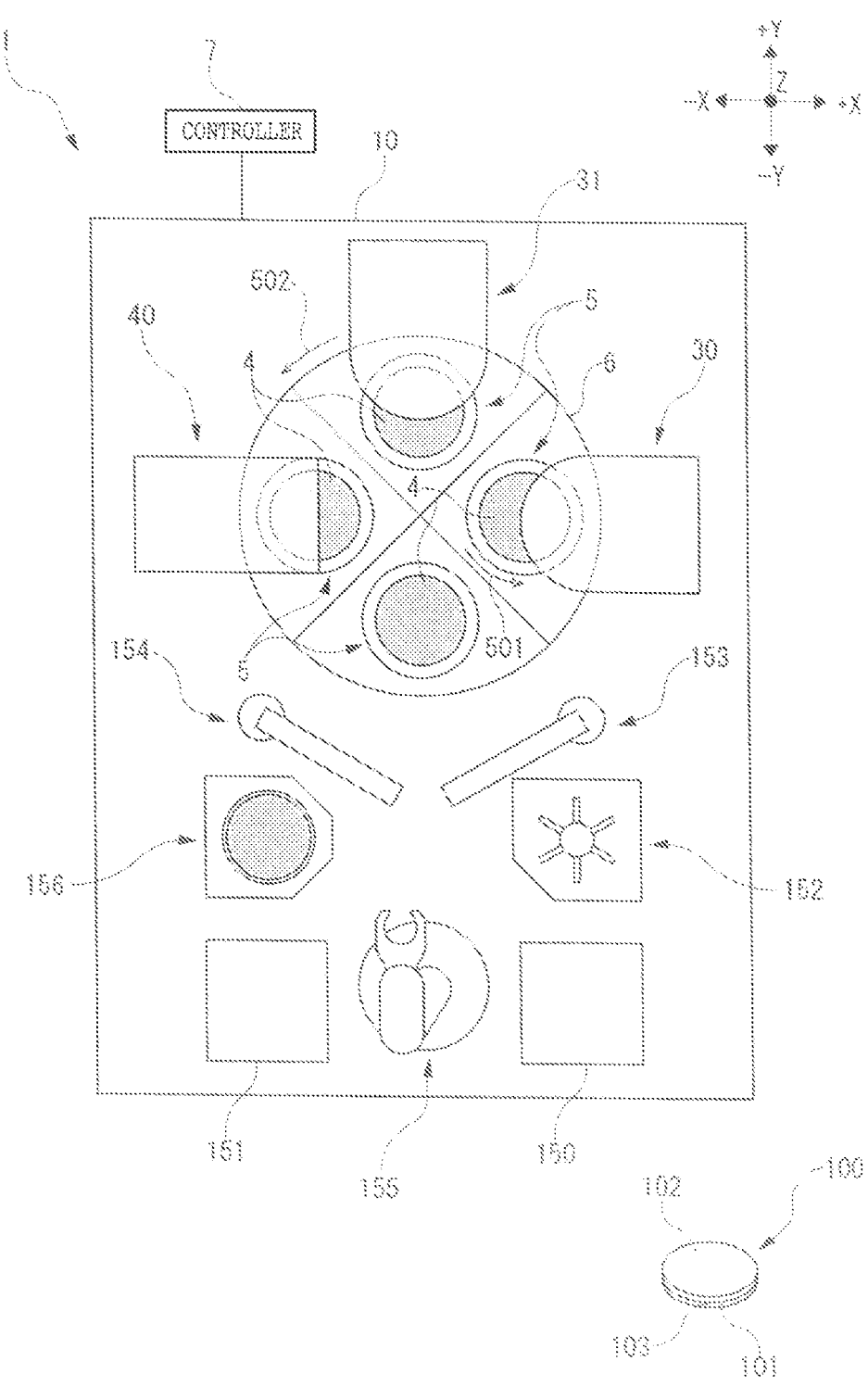
FIG. 1 is a plan view depicting the configuration of a grinding machine according to an embodiment of a second aspect of the present invention.

FIG. 1 is a plan view depicting the configuration of a grinding machine 1 according to an embodiment of a second aspect of the present invention. The grinding machine 1 depicted in FIG. 1 is an example of a processing apparatus and includes four holding tables 5 each of which can hold a wafer 100, a coarse grinding unit 30, and a finish grinding unit 31. On the grinding machine 1, the wafer 100 held on each holding table 5 is ground by the coarse grinding unit 30 and finish grinding unit 31.

On the grinding machine 1, the wafer 100 is ground at a central portion thereof, whereby a circular recess portion and an annular projection portion, which surrounds the recess portion, are formed on the wafer 100, and the recess portion is ground at a bottom surface thereof to have a bottom wall of a preset thickness. Described specifically, the grinding machine 1 is configured to perform generally-called TAIKO grinding on the wafer 100.

In the grinding machine 1, the coarse grinding unit 30 and finish grinding unit 31 are therefore configured to grind the wafer 100, which is held on a holding surface 4 of each holding table 5, at and around the center thereof by the grinding stones to form the circular recess portion at and around a center of the wafer 100 and also the annular projection portion surrounding the recess portion at and along an outer periphery of the wafer 100.

The wafer 100 depicted in FIG. 1 is an example of the workpiece, and is, for example, a circular semiconductor wafer. On a front surface 101 of the wafer 100, devices (not depicted) are formed. The front surface 101 of the wafer 100 is directed downward in FIG. 1 and is protected by a protective tape 103 bonded thereto. To a back surface 102 of the wafer 100, grinding processing is applied.

The grinding machine 1 includes a machine base 10 and a controller 7 that controls individual elements of the grinding machine 1.

On a front side (a side in −Y direction) of the machine base 10, a first cassette 150 and a second cassette 151 are disposed. The first cassette 150 and the second cassette 151 are each internally provided with a plurality of shelves, so that a plurality of wafers 100 can be stored one by one on the respective shelves.

Openings (not depicted) of the first cassette 150 and the second cassette 151 are directed toward a side in +Y direction. On a side in +Y direction of these openings, a robot hand 155 is disposed. The robot hand 155 loads each wafer 100 into the first cassette 150 or second cassette 151 after its processing. The robot hand 155 also takes out each wafer 100 from the first cassette 150 or second cassette 151 before its processing, and places it on a temporary placing unit 152.

The wafer 100 placed on the temporary placing unit 152 is placed by a loading unit 153 on the holding surface 4 of the holding table 5 that has moved to a vicinity of the temporary placing unit 152.

The holding table 5 includes the holding surface 4 for holding the wafer 100 thereon. The holding surface 4 is communicated to a suction source (not depicted), and can hold the wafer 100 under suction via the protective tape 103.

Further, the holding table 5, with the wafer 100 held on the holding surface 4, can rotate, for example, in a direction of an arrow 501 about a central axis that extends in a Z-axis direction through a center of the holding surface 4.

In this embodiment, the four holding tables 5 are disposed at equal angular intervals on an upper surface of a turn table 6 disposed on the machine base 10. The turn table 6 is an example of a moving unit, and moves each holding table 5 under the coarse grinding unit 30, the finish grinding unit 31, and a laser beam application unit 40 sequentially in this order.

On a center of the turn table 6, a rotating shaft (not depicted) is disposed to rotate the turn table 6. By this rotating shaft, the turn table 6 can be rotated, for example, in a direction of an arrow 502 about an axis of rotation that extends in the Z-axis direction. By the rotation of the turn table 6, the four holding tables 5 are revolved. Each holding table 5 can therefore be sequentially positioned in the vicinity of the temporary placing unit 152, under the coarse grinding unit 30, under the finish grinding unit 31, and under the laser beam application unit 40.

The coarse grinding unit 30 is an example of a grinding unit that grinds by a grinding wheel the wafer 100 held on each holding table 5, and is arranged, for example, on a column (not depicted) disposed upright on the machine base 10.

Figure 2:
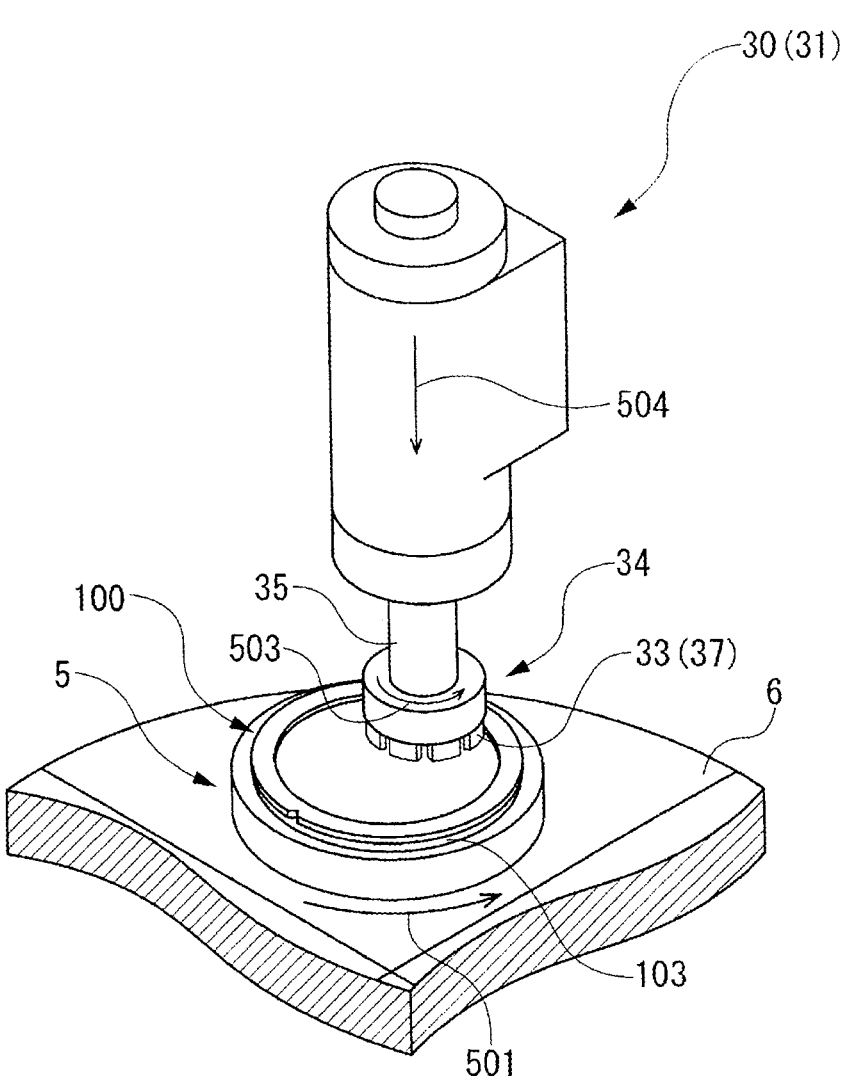
FIG. 2 is a perspective view depicting the configurations of a coarse grinding unit and a finish grinding unit of the grinding machine of FIG. 1.

FIG. 2 is a perspective view depicting the configurations of the coarse grinding unit 30 and finish grinding unit 31 of the grinding machine 1 of FIG. 1. As depicted in FIG. 2, the coarse grinding unit 30 includes a grinding wheel 34 having coarse grinding stones 33, and a spindle 35 that rotates the grinding wheel 34. The coarse grinding unit 30 is configured so that by lowering the coarse grinding unit 30 as indicated by an arrow 504 while rotating the grinding wheel 34 as indicated by an arrow 503, the wafer 100 held on the rotating holding table 5 is coarsely ground by the grinding wheel 34 (specifically, the coarse grinding stones 33 of the grinding wheel 34).

Figure 3:
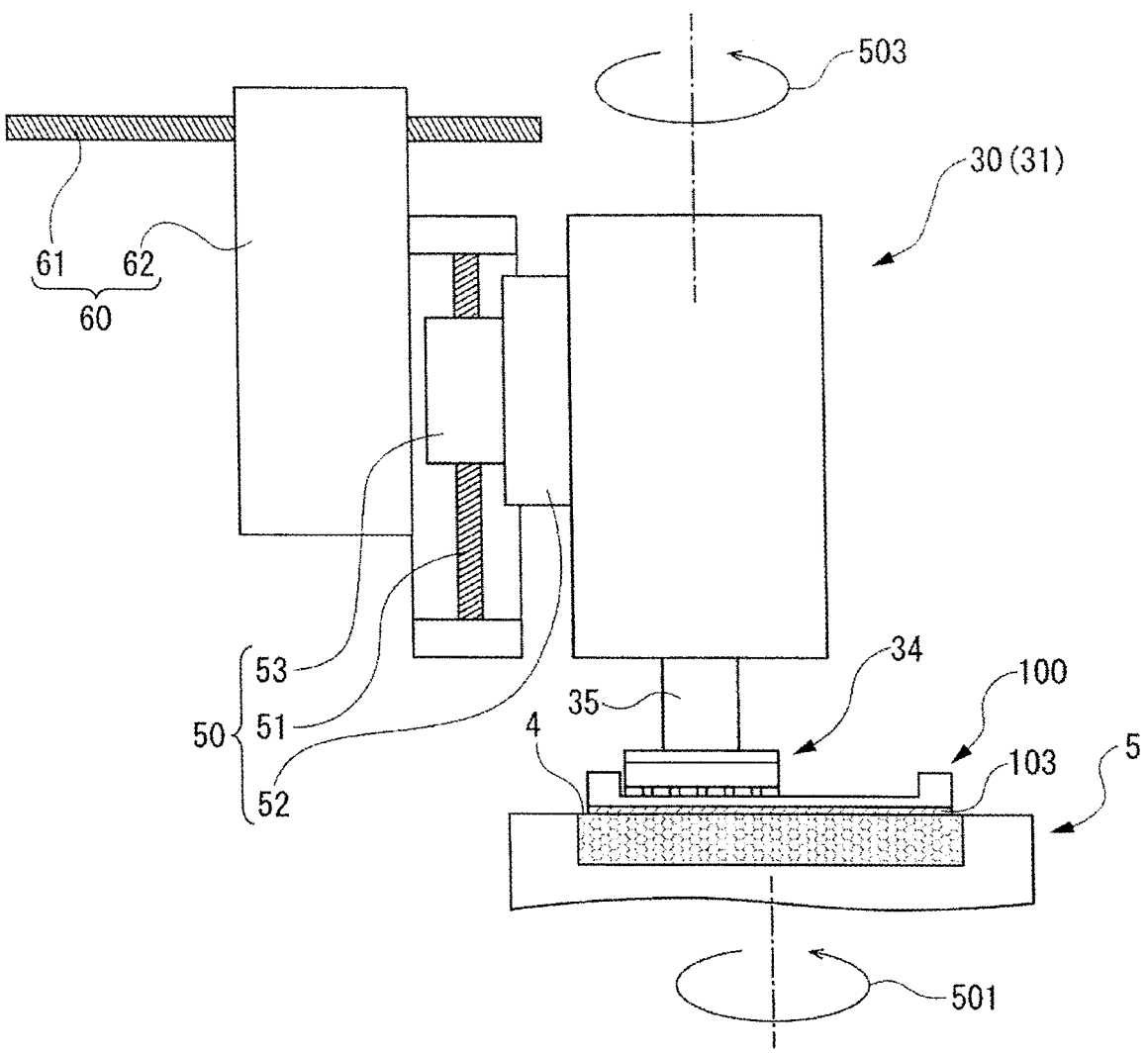
FIG. 3 is a cross-sectional view depicting the configurations of the coarse grinding unit and the finish grinding unit of the grinding machine of FIG. 1.

FIG. 3 is a cross-sectional view depicting the configurations of the coarse grinding unit 30 and finish grinding unit 31 of the grinding machine 1 of FIG. 1. As depicted in FIG. 3, the grinding machine 1 includes a vertically moving unit 50 configured to relatively move the grinding wheel 34 of the coarse grinding unit 30 in a vertical direction (Z-axis direction) with respect to the holding table 5, and a horizontally moving unit 60 configured to relatively move the grinding wheel 34 of the coarse grinding unit 30 in a horizontal direction toward the center of the wafer 100 with respect to the holding table 5.

The horizontally moving unit 60 includes a ball screw 61 extending in the horizontal direction, and a moving block 62. To the moving block 62, the vertically moving unit 50 is attached, and the vertically moving unit 50 holds the coarse grinding unit 30 thereon.

Further, the ball screw 61 is threadedly engaged with the moving block 62. At the horizontally moving unit 60, the ball screw 61 is rotated by a motor (not depicted), whereby the moving block 62 is moved in the horizontal direction toward a straight line that extends upwardly from the center of the wafer 100 held on the holding table 5. The vertically moving unit 50 attached to the moving block 62, the coarse grinding unit 30 held on the vertically moving unit 50, and the grinding wheel 34 included in the coarse grinding unit 30 are therefore moved together with the moving block 62 in the horizontal direction.

The vertically moving unit 50 has a ball screw 51 extending in the Z-axis direction, a holding plate 52 holding the coarse grinding unit 30 thereon, and a nut portion 53 attached to the holding plate 52. The ball screw 51 is threadedly engaged with this nut portion 53.

At the vertically moving unit 50, the ball screw 51 is rotated by a motor (not depicted), whereby the holding plate 52 is moved in the Z-axis direction. The coarse grinding unit 30 held on the holding plate 52, and the grinding wheel 34 included in the coarse grinding unit 30 are therefore moved together with the holding plate 52 in the Z-axis direction.

The finish grinding unit 31 is an example of another grinding unit that grinds by another grinding wheel the wafer 100 held on each holding table 5, and is arranged, for example, on another column (not depicted) disposed upright on the machine base 10. As depicted in FIGS. 2 and 3, the finish grinding unit 31 has a similar configuration as the coarse grinding unit 30 except that it has finish grinding stones 37 in place of the coarse grinding stones 33.

To move the finish grinding unit 31, the grinding machine 1 also includes, as depicted in FIG. 3, a similar configuration as that included to move the coarse grinding unit 30, specifically another vertically moving unit 50 and another horizontally moving unit 60. Described more specifically, the grinding machine 1 includes the vertically moving unit 50 configured to relatively move a grinding wheel 34 of the finish grinding unit 31 in a vertical direction with respect to the holding table 5, and the horizontally moving unit 60 configured to relatively move the grinding wheel 34 of the finish grinding unit 31, with respect to the holding table 5 positioned under the finish grinding unit 31, in a horizontal direction toward the center of the wafer 100.

After the finish grinding, the wafer 100 is positioned under the laser beam application unit 40 by rotation of the turn table 6.

Figure 4:
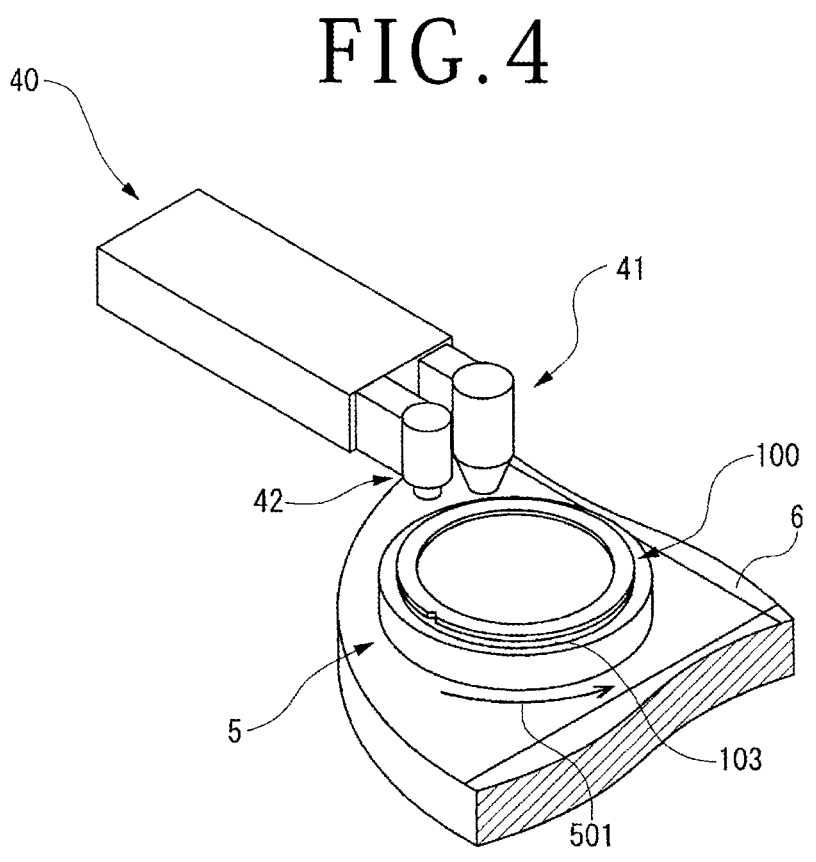
FIG. 4 is a perspective view depicting the configuration of a laser beam application unit of the grinding machine of FIG. 1.

FIG. 4 is a perspective view depicting the configuration of a laser beam application unit 40 of the grinding machine 1 of FIG. 1. As depicted in FIG. 4, the laser beam application unit 40 has a first optical system 41 and a second optical system 42, and applies laser beams to the ground surface of the wafer 100 ground by the coarse grinding unit 30 and finish grinding unit 31. The laser beam application unit 40 therefore fuses the ground surface.

Here, reference is made again to FIG. 1. After the application of the laser beams, the wafer 100 is transferred to a rinsing unit 156 by the unloading unit 154 and is rinsed. By the robot hand 155, the rinsed wafer 100 is loaded into the first cassette 150 or second cassette 151 (the cassette from which this wafer 100 is taken out).

The controller 7 controls the individual elements of the grinding machine 1 to perform grinding processing on the wafer 100. A description will hereinafter be made about a processing method according to a first embodiment of a first aspect of the present invention for the wafer 100 as a workpiece on the grinding machine 1.

(1) Holding Step

In the processing of the wafer 100, the controller 7 first controls the robot hand 155 depicted in FIG. 1, whereby the wafer 100 before its processing is taken out, for example, from the first cassette 150, and is placed on the temporary placing unit 152. The controller 7 then controls the loading unit 153 to hold the wafer 100 placed on the temporary placing unit 152, and places the wafer 100, with the back surface 102 directed upward, on the holding surface 4 of the holding table 5 in the vicinity of the temporary placing unit 152. After that, the controller 7 brings the holding surface 4 into communication with the suction source (not depicted). As a consequence, the holding surface 4 holds the wafer 100 under suction via the protective tape 103. In the manner described above, the wafer 100 is held on the holding table 5.

(2) Grinding Step

In this step, the coarse grinding unit 30 and the finish grinding unit 31 sequentially grind the wafer 100, which is held on the holding table 5, at and around the center thereof by the grinding wheel 34 (specifically, the coarse grinding stones 33 and the finish grinding stones 37), whereby a recess portion is formed at and around the wafer 100, and an annular projection portion is formed surrounding the recess portion on the outer periphery of the wafer 100.

(2-1) Coarse Grinding Step

After the holding step, the controller 7 rotates the turn table 6 depicted in FIG. 1, whereby the holding table 5 with the wafer 100 held thereon is positioned under the coarse grinding unit 30.

Figure 5:
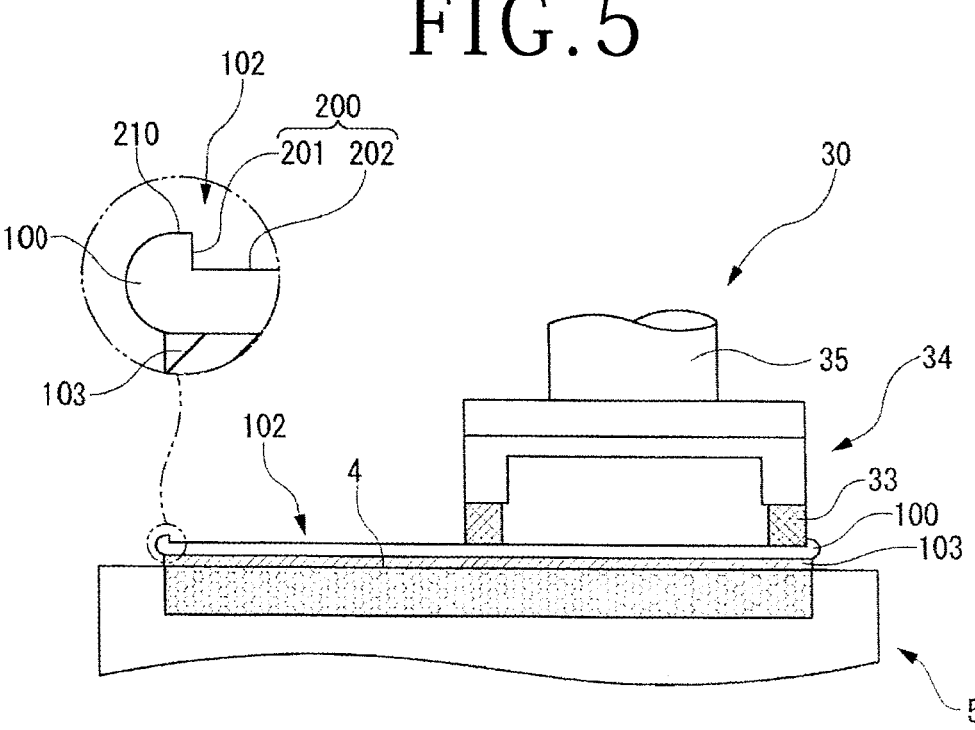
FIG. 5 is a cross-sectional view depicting a coarse grinding step in a processing method according to an embodiment of a first aspect of the present invention.

FIG. 5 is a cross-sectional view depicting a coarse grinding step in the processing method according to the embodiment of the first aspect of the present invention. The controller 7 then controls the horizontally moving unit 60 depicted in FIG. 3 to adjust the position of the coarse grinding unit 30 in the horizontal direction, whereby the coarse grinding stones 33 of the grinding wheel 34 are positioned on an inner side of the outer periphery of the wafer 100.

Subsequently, the controller 7 rotates the grinding wheel 34 of the coarse grinding unit 30, and also feeds the coarse grinding unit 30 for grinding along the Z-axis direction by the vertically moving unit 50. Further, the controller 7 rotates the holding table 5 by a drive source (not depicted).

As a consequence, the coarse grinding stones 33 of the rotating grinding wheel 34 are brought into contact with the back surface 102 of the wafer 100 held on the rotating holding table 5, so that the back surface 102 is coarsely ground.

In this grinding, the controller 7 positions outer edges of the coarse grinding stones 33 on the inner side of the outer periphery of the wafer 100. The back surface 102 of the wafer 100 is therefore ground at and around the center thereof by the coarse grinding stones 33. As a consequence, a recess portion 200 that has a bottom surface 202 and an inner side surface 201 is formed in the back surface 102 of the wafer 100 as depicted in FIG. 5. Along an outer periphery of the recess portion 200, an annular projection portion 210 is also formed surrounding the recess portion 200.

During the grinding by the coarse grinding stones 33, the controller 7 measures the thickness of a bottom surface 202 of the recess portion 200 using a thickness gauge (not depicted). The controller 7 then continues the grinding by the coarse grinding stones 33 until the thickness of the bottom surface 202 decreases to a predetermined coarse grinding thickness.

(2-2) Finish Grinding Step

In a finish grinding step, the surface of the wafer 100 ground by the coarse grinding stones 33 is finish ground. In this step, the controller 7 first rotates the turn table 6 depicted in FIG. 1, whereby the holding table 5 with the wafer 100 held thereon is positioned under the finish grinding unit 31.

The controller 7 then controls the horizontally moving unit 60 depicted in FIG. 3 to adjust the position of the finish grinding unit 31 in the horizontal direction, whereby the finish grinding stones 37 are positioned at a location on the inner side of the outer periphery of the wafer 100, the inner location being similar to the location where the coarse grinding stones 33 were arranged in the coarse grinding step.

As in the coarse grinding step, the controller 7 then rotates the grinding wheel 34, and also feeds the finish grinding unit 31 for grinding along the Z-axis direction by the vertically moving unit 50. Further, the controller 7 rotates the holding table 5 by the drive source (not depicted).

As a consequence, the finish grinding stones 37 of the rotating grinding wheel 34 are brought into contact with the recess portion 200 in the back surface 102 of the wafer 100 held on the rotating holding table 5, so that the recess portion 200 is finish ground.

During the grinding by the finish grinding stones 37, the controller 7 measures the thickness of the bottom surface 202 of the recess portion 200 using a thickness gauge (not depicted). The controller 7 then continues the grinding by the finish grinding stones 37 until the thickness of the bottom surface 202 decreases to a predetermined finish grinding thickness.

(3) Fusion Step

Figures 6, 7:
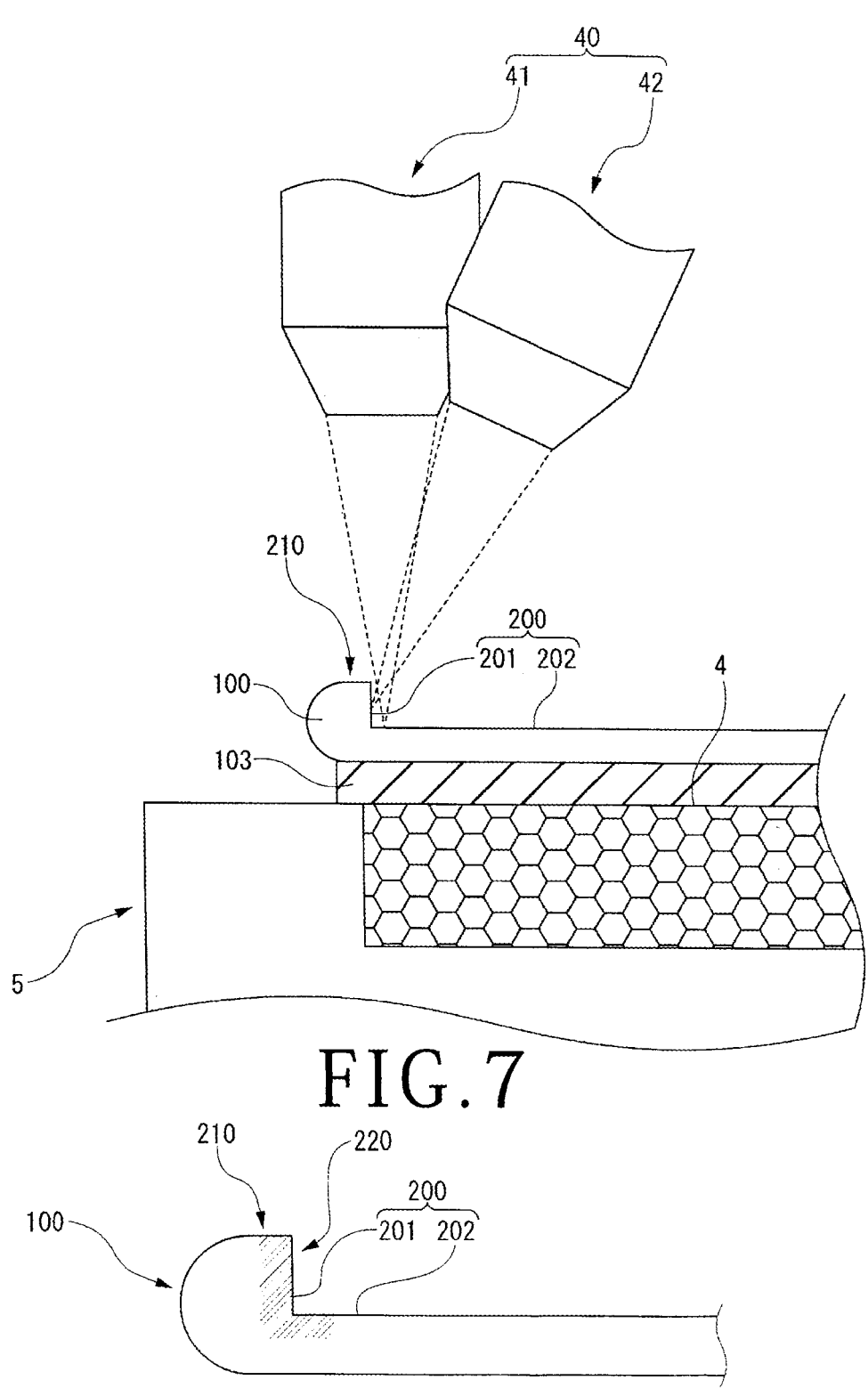
FIG. 6 is a cross-sectional view depicting a fusion step in the processing method.
FIG. 7 is a fragmentary cross-sectional view depicting a boundary region in a recess portion of a wafer as a workpiece before start of the fusion step.

FIG. 6 is a cross-sectional view depicting a fusion step in the processing method. FIG. 7 is a fragmentary cross-sectional view depicting a boundary region 220 in the recess portion 200 of the wafer 100 before start of the fusion step. In this step, the laser beam application unit 40 applies laser beams to the recess portion 200 and the boundary region 220, which includes a boundary between the annular projection portion 210 and the recess portion 200, in the back surface 102 of the wafer 100, the back surface 102 being the ground surface in the grinding step, so that the recess portion 200 and the boundary region 220 are fused. The recess portion 200 and the boundary region 220, which are to be fused in the fusion step, include the ground surface, and a subsurface formed with a predetermined thickness from the ground surface, containing cracks, marks, damage and the like due to the processing, and having a strain.

Now, a detailed description will be made about the configuration of the laser beam application unit 40. As depicted in FIG. 6, the first optical system 41 of the laser beam application unit 40 is configured to apply a laser beam to the bottom surface 202 of the recess portion 200 of the wafer 100. The second optical system 42, on the other hand, is configured to apply another laser beam to the boundary region 220 (the hatched portion in FIG. 7) in the recess portion 200 of the wafer 100.

As depicted in FIG. 7, the boundary region 220 includes the boundary between the recess portion 200 and the annular projection portion 210, and peripheries of the boundary. Described specifically, the boundary region 220 includes the inner side surfaced 201 of the recess portion 200, and vicinities of the inner side surface 201 on the bottom surface 202 (an outer peripheral portion of the bottom surface 202, which continues to the inner side surface 201).

Figures 8, 9:
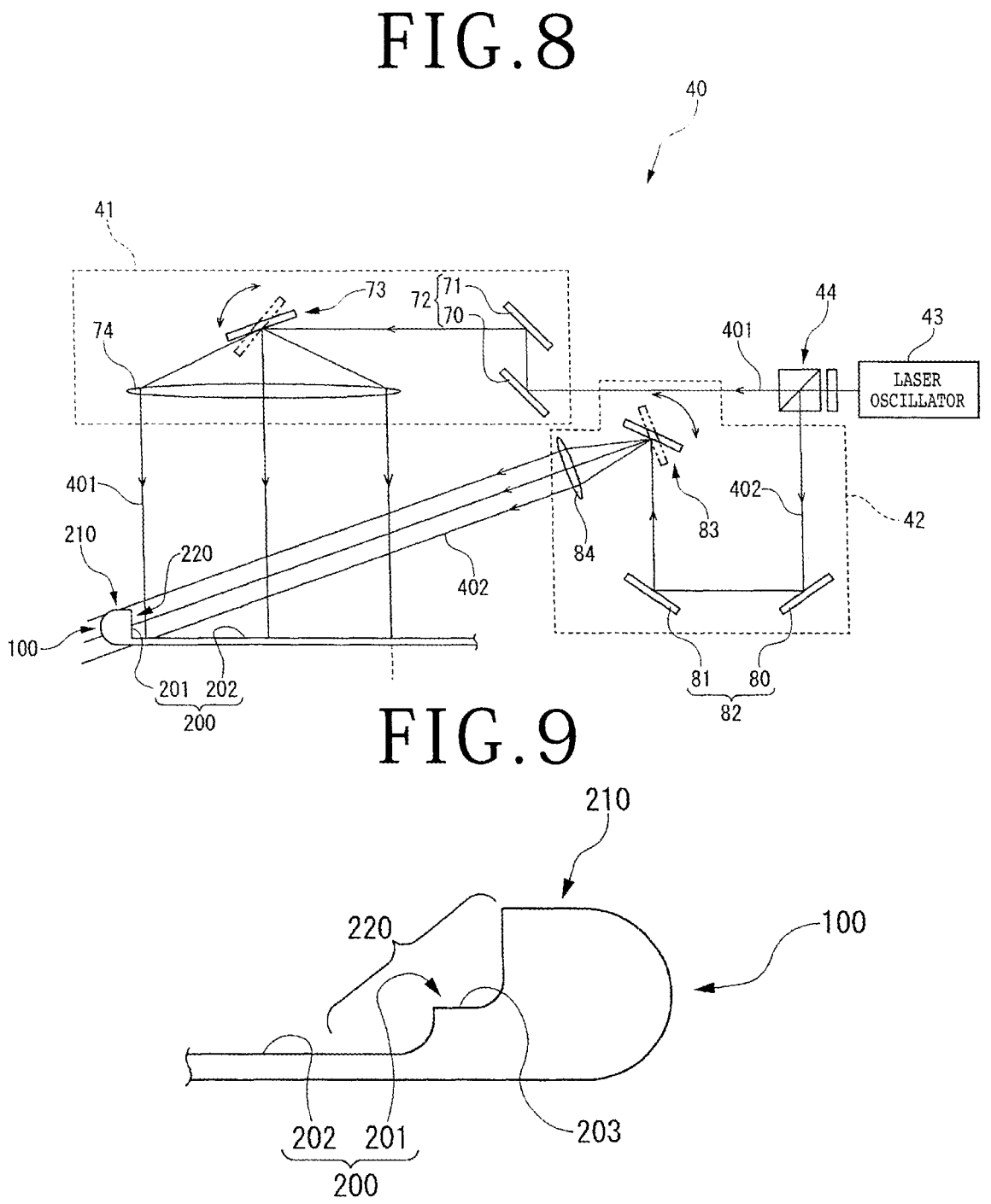
FIG. 8 is a schematic diagram depicting an optical system of the laser beam application unit of FIG. 4 for use in the fusion step.
FIG. 9 is a fragmentary cross-sectional view depicting another boundary region.

FIG. 8 is a schematic diagram depicting the optical systems of the laser beam application unit 40 of FIG. 4 for use in the above-described fusion step. As depicted in this figure, the laser beam application unit 40 includes, in addition to the first optical system 41 and second optical system 42, a laser oscillator 43 that emits a laser beam, and a beam splitter 44 that splits the emitted laser beam into two laser beams, that is, a first laser beam 401 and a second laser beam 402. The first laser beam 401 enters the first optical system 41, while the second laser beam 402 enters the second optical system 42.

The first optical system 41 and second optical system 42 are each configured to apply the corresponding laser beam to the wafer 100 via an associated galvano scanner to be described below.

As depicted in FIG. 8, the first optical system 41 has a first mirror group 72 having a plurality of mirrors 70 and 71 that reflects the first laser beam 401 to adjust its optical path, a first galvano mirror (galvano scanner) 73, and a first fθ lens 74.

The first galvano mirror 73 reflects the first laser beam 401 from the first mirror group 72 while undergoing oscillation (pivoting), so that the first laser beam 401 is dispersed and applied to substantially the entire surface of the first fθ lens 74.

The first fθ lens 74 is a one-dimensional fθ lens of relatively large diameter having a plurality of lenses. The first fθ lens 74 is, for example, of the telecentric type, and applies the first laser beam 401, which has entered via the first galvano mirror 73, as parallel beams of equal focus height to the bottom surface 202 of the recess portion 200 in the wafer 100.

On the other hand, the second optical system 42 has a second mirror group 82 having a plurality of mirrors 80 and 81 that reflects the second laser beam 402 to adjust its optical path, a second galvano mirror (galvano scanner) 83, and a second fθ lens 84.

The second galvano mirror 83 reflects the second laser beam 402 from the second mirror group 82 while undergoing oscillation (pivoting), so that the second laser beam 402 is dispersed and applied to substantially the entire surface of the second fθ lens 84.

The second fθ lens 84 is a one-dimensional fθ lens of relatively small diameter having a plurality of lenses. The second fθ lens 84 is, for example, of the telecentric type, and applies the second laser beam 402, which has entered via the second galvano mirror 83, as parallel beams of equal focus height from an oblique direction to the boundary region 220 of the recess portion 200 in the wafer 100.

The controller 7 performs the fusion step by the laser beam application unit 40 of such a configuration as described above. Described specifically, the controller 7 first rotates the turn table 6 depicted in FIG. 1, and positions the holding table 5 with the wafer 100 held thereon under the laser beam application unit 40.

The controller 7 next controls the first galvano mirror 73 and second galvano mirror 83 and adjusts the optical paths of the first laser beam 401 and second laser beam 402, so that the first laser beam 401 is applied to the bottom surface 202 of the recess portion 200 in the wafer 100 and the second laser beam 402 is applied from the oblique direction to the boundary region 220 of the recess portion 200.

The controller 7 then controls the laser oscillator 43 of the laser beam application unit 40 while rotating the holding table 5 by the drive source (not depicted), whereby the first laser beam 401 is applied from the first optical system 41 to the bottom surface 202 of the recess portion 200 in the wafer 100, and the second laser beam 402 is applied from the second optical system 42 to the boundary region 220 of the recess portion 200. As a consequence, the first laser beam 401 and second laser beam 402 are applied to the ground surface, that is, the recess portion 200 of the wafer 100, so that the recess portion 200 is fused.

After the first laser beam 401 has been applied to the entirety of the bottom surface 202 in the recess portion 200 and the second laser beam 402 has been applied to the entirety of the boundary region 220, the controller 7 stops the application of the first laser beam 401 and second laser beam 402. As a consequence, the fused boundary region 220 and the recess portion 200 are allowed to cool and solidify.

In the processing method of this embodiment, the fusion step is performed after the grinding step as described above, so that the subsurface formed in the inner side surface 201 of the annular projection portion 210, the inner side surface 201 being a part of the boundary region 220, with which the grinding wheel 34 came into contact in the grinding step, and the subsurface in the ground surface in the grinding step, that is, the recess portion 200 of the wafer 100 are fused by the application of the first laser beam 401 and second laser beam 402. The fused boundary region 220 and recess portion 200 are then allowed to cool and solidify upon stopping of the application of the first laser beam 401 and second laser beam 402.

Through such a process of fusion and cooling, the processing method of this embodiment can fuse the subsurfaces (strained layers) formed by the grinding step with the predetermined thickness from the ground surface of the boundary region 220 and recess portion 200, allows the fused regions to undergo crystal growth and to form seed crystals, and can then achieve recrystallization. It is therefore possible to planarize the boundary region 220 and the recess portion 200, and also to fill and close cracks occurred through the grinding step in the subsurfaces formed with the predetermined thickness from the ground surfaces. Damage inside the wafer 100 as the workpiece can be alleviated accordingly. As the flexural strength of the wafer 100 can be enhanced by the planarization, it is also possible to reduce a risk of occurrence of fracture or chipping on the wafer 100 in subsequent steps after the fusion step and also to enhance the flexural strength of chips when divided into the chips.

Here, for treatment (planarization and damage alleviation) of the ground surfaces, it may also be possible to polish the ground surfaces (to subject the ground surfaces to chemical mechanical polishing (CMP) or dry polishing) with a polishing pad. In this embodiment, however, the ground surfaces of the wafer 100 are located at the recess portion 200 surrounded by the annular projection portion 210. In view of the shape of the recess portion 200, it is difficult to bring the grinding pad into contact with the above-described recess portion 200 neither too much nor too little. Further, CMP is treatment that uses a chemical solution or slurry, and CMP and dry polishing each remove portions of the ground surfaces and hence cause polishing debris. Polishing therefore has a possibility of contaminating the workpiece and the inside of the machine. In contrast, the treatment to eliminate damage by the laser beam application unit 40 is performed by fusion, so that no solution or slurry treatment is needed, and no processing debris occurs, thereby bringing about another advantageous effect that the workpiece and machine are not contaminated.

In the fusion step in the processing method of this embodiment, on the other hand, the application ranges of the first laser beam 401 and second laser beam 402 can be readily varied by controlling the first galvano mirror 73 and second galvano mirror 83 to change the optical paths of the first laser beam 401 and second laser beam 402. In this embodiment, the laser beams can hence be easily applied to the entirety of the recess portion 200 in the fusion step, so that the recess portion 200 can be treated well and efficiently.

In the fusion step in the processing method of this embodiment, the second laser beam 402 is applied to the boundary region 220 of the recess portion 200 by the second optical system 42. As a consequence, the boundary region 220 is fused and is allowed cool, so that, even if cracks have been formed in the boundary region 220 in the grinding step, the cracks can be filled and closed. It is hence possible to reduce the possibility that fracture or chipping may occur on the wafer 100 from the cracks as starting points in a subsequent step.

In the above-mentioned grinding step, the inner side surface 201 of the recess portion 200 in the wafer 100 may be also formed as an oblique surface.

For example, the coarse grinding unit 30 may be configured to grind the wafer 100 while relatively moving the grinding wheel 34 with respect to the holding table 5 by the vertically moving unit 50 and the horizontally moving unit 60 (see FIG. 3), so that an oblique surface is formed inclined in a step shape or a slope shape toward a center of the recess portion 200 (the center of the wafer 100) from a side of an inner periphery of an upper surface of the annular projection portion 210 in the wafer 100.

In this case, the coarse grinding step in the grinding step includes a vertical direction grinding step of relatively moving the grinding wheel 34, which includes the coarse grinding stones 33, in a vertical direction with respect to the holding table 5, and a horizontal direction moving step of relatively moving the grinding wheel 34 with respect to the holding table 5 in a horizontal direction toward the center of the wafer 100. By the vertical direction grinding step and the horizontal direction moving step, the oblique surface is formed inclined in the step shape or the slope shape from the side of the inner periphery of the upper surface of the annular projection portion 210 toward the center of the recess portion 200. The vertical direction grinding step and the horizontal direction moving step may be repeated a plurality of times.

FIG. 9 is a fragmentary cross-sectional view depicting another boundary region 220 different from the boundary region 220 of FIG. 7. Described specifically, the controller 7 may form the inner side surface 201 of the recess portion 200 in the wafer 100 into an oblique surface inclined in a step shape from the side of the inner periphery of the upper surface of the annular projection portion 210 toward the center of the recess portion 200 as depicted in FIG. 9.

In this case, the controller 7 first controls the vertically moving unit 50 in the coarse grinding step to perform the vertical direction grinding step, whereby the grinding wheel 34 with the rotating coarse grinding stones 33 included thereon is lowered in the vertical direction to form the recess portion 200 as depicted in FIG. 5. In the course of the vertical direction grinding step, the controller 7 stops the vertical direction grinding step (the lowering of the grinding wheel 34) before the thickness of the bottom surface 202 of the recess portion 200 reaches the predetermined coarse grinding thickness, and then controls the horizontally moving unit 60 to perform the horizontal direction moving step, whereby the grinding wheel 34 is horizontally moved to bring the coarse grinding stones 33 closer by a predetermined distance toward the center of the wafer 100.

After that, the controller 7 stops the horizontal direction moving step (the horizontal moving of the grinding wheel 34), and then performs the vertical direction grinding step again, whereby grinding by the coarse grinding stones 33 is performed until the thickness of the bottom surface 202 of the recess portion 200 decreases to the predetermined coarse grinding thickness. As a consequence, as depicted in FIG. 9, the inner side surface 201 of the recess portion 200 is formed into an oblique surface of a step shape including a horizontal surface 203.

In the finish grinding step, the controller 7 also grinds, for example, only the bottom surface 202 of the recess portion 200 formed in the coarse grinding step, so that the thickness of the bottom surface 202 is reduced to the predetermined finish thickness.

By the grinding step as described above, the inner side surface 201 of the oblique surface is included in the boundary region 220. By the fusion step, the second laser beam 402 is then applied to the boundary region 220 including the inner side surface 201 of the oblique surface, so that the applied portion is fused and is allowed to cool.

Owing to the formation of the inner side surface 201 into the oblique surface, this configuration can suppress fracture of the wafer 100 under stress which would otherwise concentrate at a corner portion between the inner side surface 201 and the bottom surface 202. Further, this configuration has an advantageous effect of facilitating to form a metal film to an outer periphery of the bottom surface 202 when forming the metal film on the ground surface in a subsequent step, and also an advantageous effect of increasing the degree of adhesion of the protective tape at the boundary region 220 when bonding the protective tape to the ground surface in a subsequent step.

Figure 10:
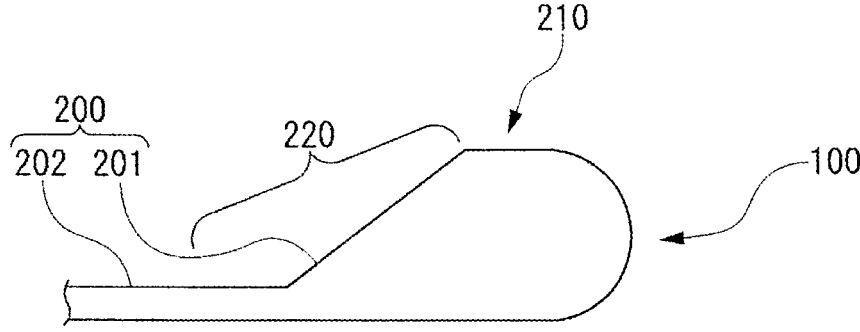
FIG. 10 is a fragmentary cross-sectional view depicting a further boundary region.

FIG. 10 is a fragmentary cross-sectional view depicting a further boundary region. The controller 7 may also form the inner side surface 201 of the recess portion 200 in the wafer 100 into an oblique surface that, as depicted in FIG. 10, is inclined in a slope shape from the side of the inner periphery of the upper surface of the annular projection portion 210 toward the center of the recess portion 200.

In this case, the controller 7 performs the horizontal direction moving step (the horizontal moving of the grinding wheel 34) in the coarse grinding step while performing the vertical direction grinding step (the lowering of the grinding wheel 34) until the thickness of the bottom surface 202 of the recess portion 200 decreases to the predetermined coarse grinding thickness. As a consequence, as depicted in FIG. 10, the inner side surface 201 of the recess portion 200 is formed into an oblique surface of a step-free slope shape.

Figure 11:
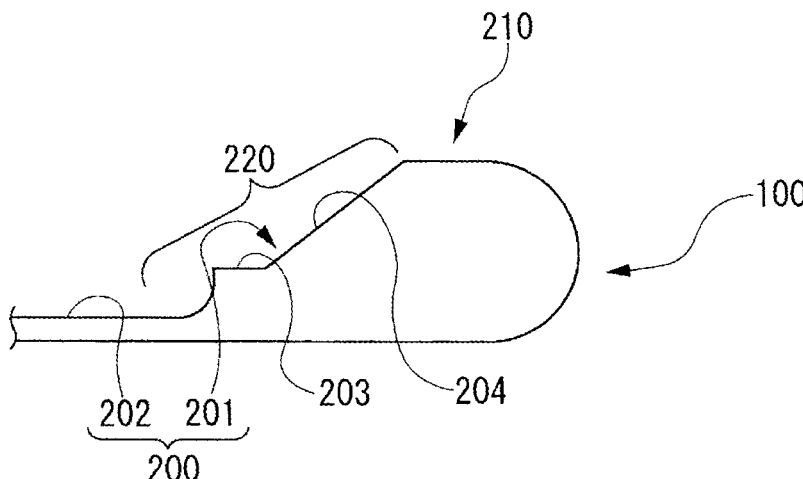
FIG. 11 is a fragmentary cross-sectional view depicting a still further boundary region.

FIG. 11 is a fragmentary cross-sectional view depicting a still further boundary region. The controller 7 may also form the inner side surface 201 of the recess portion 200 in the wafer 100 into such an oblique surface as depicted in FIG. 11. In this case, the controller 7 performs the horizontal direction moving step in the coarse grinding step while performing the vertical direction grinding step. The controller 7 then stops the vertical direction grinding step before the thickness of the bottom surface 202 in the recess portion 200 reaches the predetermined coarse grinding thickness.

After moving the coarse grinding stones 33 closer by a predetermined distance toward the center of the wafer 100, the controller 7 stops the horizontal direction moving step, and then performs the vertical direction grinding step again, whereby grinding by the coarse grinding stones 33 is performed until the thickness of the bottom surface 202 of the recess portion 200 decreases to the predetermined coarse grinding thickness. As a consequence, as depicted in FIG. 11, the inner side surface 201 of the recess portion 200 is formed into an oblique surface including a horizontal surface 203 and a slope 204.

It is to be noted that, despite the inner side surface 201 is the oblique surface including the horizontal surface 203, the inner side surface 201 can be fused well as the second laser beam 402 from the second optical system 42 is applied to the inner side surface 201 from the oblique direction as depicted in FIG. 8.

If the inner side surface 201 is not formed as an oblique surface, on the other hand, the horizontally moving unit 60 may be omitted from the grinding machine 1 if the disposed positions in the horizontal direction of the coarse grinding unit 30 and finish grinding unit 31 are set to enable the performance of TAIKO grinding for the formation of the recess portion 200 and annular projection portion 210 in the wafer 100 by the coarse grinding unit 30 and finish grinding unit 31.

In the fusion step in the processing method of this embodiment, the boundary region 220 to be fused by the second laser beam 402 from the second optical system 42 is set to be the region that, as depicted in FIG. 7, includes the inner side surface 201 of the recess portion 200 and the vicinities to the inner side surface 201 on the bottom surface 202. In this respect, the boundary region 220 to be fused by the second laser beam 402 may be a region that includes at least one of the inner side surface of the annular projection portion 210 (specifically, the inner side surface 201 of the recess portion 200) and the outer peripheral portion of the bottom surface 202, which is continuous with the inner side surface 201.

In the boundary region 220, for example, stress tends to concentrate most at the boundary between the recess portion 200 and the annular projection portion 210, so that the wafer 100 is prone to fracture at the boundary. It is therefore preferred that damage to the substructure at the boundary be removed. For this reason, the inner side surface 201 of the recess portion 200 may not be included in its entirety in the boundary region 220. How much of the outer peripheral portion of the bottom surface 202, which is continuous with the inner side surface 201, should be included in the boundary region 220 may therefore be adjusted in view of the lengths of cracks formed in the recess portion 200 or productivity such as how much the laser beams can be deflected.

In the processing method of this embodiment, when applying the laser beams from the first optical system 41 and second optical system 42 in the fusion step, the first galvano mirror 73 and second galvano mirror 83 are oscillated at high frequency while the holding table 5 makes a single rotation, so that each laser beam is converged in a concentric pattern on a plurality of focal points to form a plurality of applied lines.

Concerning the first optical system 41 that applies the first laser beam 401 to the bottom surface 202 in the recess portion 200 of the wafer 100 (see FIG. 8), however, the region to be applied by the first laser beam 401 is wide. Merely with the oscillation of the first galvano mirror 73 that can be performed during a single rotation of the holding table 5, the first laser beam 401 may hence be difficult in some instances to cover the region to be applied.

If this is the case, the application range of the first optical system 41 for the bottom surface 202 may be varied by changing the tilt of the first galvano mirror 73 for every single rotation of the holding table 5. While oscillating the first galvano mirror 73 to a certain extent at the changed tilt, the holding table 5 may then be rotated to form a plurality of applied lines again.

Figure 12:
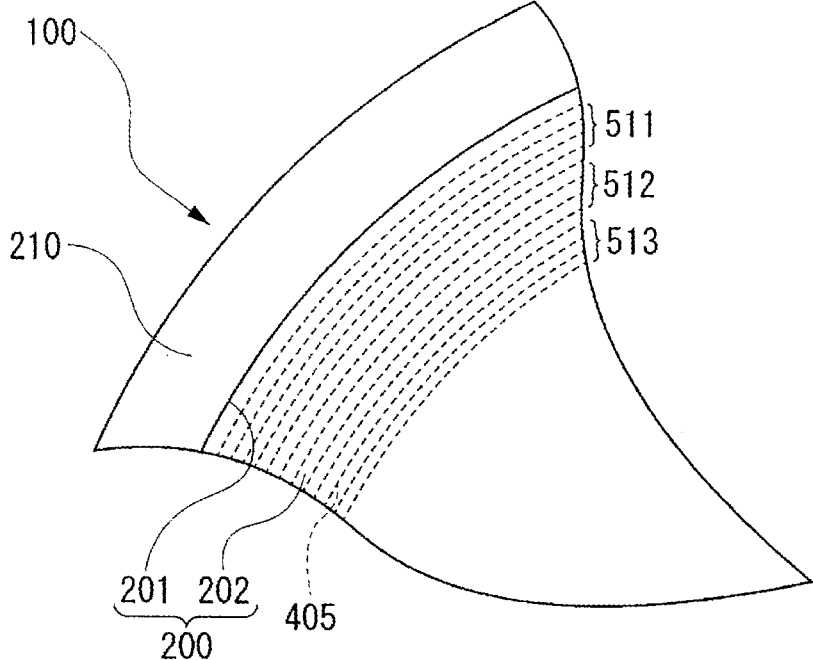
FIG. 12 is a fragmentary plan view depicting a plurality of varied application ranges of a first laser beam in the optical system of FIG. 8.

FIG. 12 is a fragmentary plan view depicting a plurality of varied application ranges of the first laser beam 401 in the optical system of FIG. 8. Described specifically, the controller 7 may control the first galvano mirror 73, so that, as depicted in FIG. 12, the first laser beam 401 is applied to the bottom surface 202 part after part for every single rotation of the holding table 5. In FIG. 12, the ranges in which the first laser beam 401 is applied during the first rotation to the third rotation of the holding table 5 are designated as ranges 511 to 513, respectively. In each of the ranges 511 to 513, a plurality of applied lines 405 are included.

When varying the application range of the first optical system 41 for the bottom surface 202, the holding table 5 with the wafer 100 held thereon may be moved in the horizontal direction (XY direction) instead of changing the tilt of the first galvano mirror 73. As a further alternative, the laser beam application unit 40 may be moved in the horizontal direction (XY direction) instead of the holding table 5.

In the processing method of this embodiment, the boundary region 220 and the bottom surface 202 in the recess portion 200 of the wafer 100 are fused in their entirety in the fusion step by application of the laser beams while the first optical system 41 and the second optical system 42 are used. In this respect, only the boundary region 220 in the recess portion 200 may be fused using only the second optical system 42 without using the first optical system 41 in the fusion step.

Even in this case, the boundary region 220 is fused and is allowed to cool, so that cracks in the boundary region 220 can be filled and closed. It is therefore possible to reduce the possibility of occurrence of fracture or cracking on the wafer 100 from the cracks as starting points. Moreover, the surface of the boundary region 220 can be planarized, so that the flexural strength of the wafer 100 is enhanced to make the wafer 100 resistant to fracture.

To apply the first laser beam 401 to the entirety of the bottom surface 202 of the recess portion 200 by the first optical system 41, it may become necessary to change the tilt of the first galvano mirror 73 or to move the holding table 5 in the horizontal direction as mentioned above. By not performing the application of the first laser beam 401 from the first optical system 41 to the bottom surface 202, however, it is possible to omit the configuration for changing the tilt of the first galvano mirror 73 or for horizontally moving the holding table 5, and also to shorten the application time of the laser beams in the fusion step.

In the fusion step, the controller 7 may perform the application of the first laser beam 401 from the first optical system 41 to the bottom surface 202 in the recess portion 200 of the wafer 100 and the application of the second laser beam 402 from the second optical system 42 to the boundary region 220 either concurrently or separately (see FIG. 8).

When the application of the first laser beam 401 and the application of the second laser beam 402 are performed concurrently, there is a possibility that these laser beams may interfere with each other. Especially when the second laser beam 402 is applied to the boundary region 220 while applying the first laser beam 401 to vicinities of the center of the bottom surface 202, the possibility of interference of these laser beams increases.

The application of the second laser beam 402 by the second optical system 42 is completed earlier than the application of the first laser beam 401 by the first optical system 41, because the boundary region 220 is smaller in area compared with the bottom surface 202.

If the application of the first laser beam 401 and the application of the second laser beam 402 are performed concurrently, it is therefore preferred that the controller 7 first apply the second laser beam 402 to the boundary region 220 and the first laser beam 401 to an outer part of the bottom surface 202, the outer part being close to the boundary region 220, and after completion of the application of the second laser beam 402 to the boundary region 220, stop the application of the second laser beam 402 and apply the first laser beam 401 to the vicinities of the center of the bottom surface 202. In this manner, it is possible to suppress the interference between the first laser beam 401 and the second laser beam 402.

The application of the laser beam from only one of the first optical system 41 and the second optical system 42 is performed by stopping the application of the laser beam from the other. For this purpose, attenuators (not depicted) may be arranged on downstream sides of the beam splitter 44 (see FIG. 8) in the optical paths of the laser beams (between the beam splitter 44 and the first optical system 41, and between the beam splitter 44 and the second optical system 42). In this case, the power of the first laser beam 401 to be incident to the first optical system 41 or that of the second laser beam 402 to be incident to the second optical system 42 can be controlled to zero by the associated attenuator. The application of the laser beam from the first optical system 41 or the second optical system 42 can therefore be stopped with ease.

The grinding machine 1 of this embodiment has, as grinding units, the coarse grinding unit 30 and the fine grinding unit 31. In this respect, the grinding machine 1 may have only one grinding unit (for example, the coarse grinding unit 30), and by this grinding unit, may form the recess portion 200 at and around the center of the wafer 100 and may also form the annular projection portion 210 surrounding the recess portion 200 at the outer periphery of the wafer 100.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A processing method for a workpiece, comprising:
    a holding step of holding the workpiece on a holding table;
    a grinding step of grinding the workpiece that is held on the holding table at and around a center thereof by a grinding wheel, so that a recess portion is formed at and around the center of the workpiece, an annular projection portion is formed surrounding the recess portion at and along an outer periphery of the workpiece, and an inner side surface is formed between the recess portion and the annular projection portion; and a fusion step of applying a laser beam to a boundary region including the inner side surface and a bottom surface of the recess portion, so that the boundary region is fused.

2. The processing method according to claim 1, wherein the boundary region includes at least one of an inner side surface of the annular projection portion and an outer peripheral portion of the recess portion, the outer peripheral portion being continuous with the inner side surface.

3. The processing method according to claim 1, wherein the grinding step includes a vertical direction grinding step of relatively moving the grinding wheel in a vertical direction with respect to the holding table, and

16 a horizontal direction moving step of relatively moving the grinding wheel with respect to the holding table in a horizontal direction toward the center of the workpiece, wherein by the vertical direction grinding step and the horizontal direction moving step, an oblique surface is formed inclined in a step shape or a slope shape from a side of an inner periphery of an upper surface of the annular projection portion toward a center of the recess portion, and the boundary region includes the oblique surface.

4. The processing method according to claim 1, wherein the laser beam is output by a laser oscillator and separated into a first laser beam and a second laser beam, and the first laser beam is applied to the bottom surface of the recess portion, and the second laser beam is applied to the inner side surface of the recess portion.

5. The processing method according to claim 4, wherein the first laser beam is emitted from a first optical system and the second laser beam is emitted from a second optical system.

* * * * *